United States Patent [19]

Kawai

[11] Patent Number: 5,194,964
[45] Date of Patent: Mar. 16, 1993

[54] APPARATUS FOR PROCESSING COLOR OR BLACK AND WHITE VIDEO SIGNALS

[75] Inventor: Hisashi Kawai, Kanagawa, Japan

[73] Assignee: Canon Kabushiki Kaisha, Tokyo, Japan

[21] Appl. No.: 879,715

[22] Filed: May 6, 1992

Related U.S. Application Data

[63] Continuation of Ser. No. 390,175, Aug. 7, 1989, abandoned.

[30] Foreign Application Priority Data

Sep. 15, 1988 [JP] Japan .............................. 63-230869

[51] Int. Cl.$^5$ ................................................ H04N 9/79
[52] U.S. Cl. ...................................... 358/316; 358/319; 358/27
[58] Field of Search .................... 358/19, 27, 36, 37, 358/55, 156, 166, 310, 316, 327, 328

[56] References Cited

U.S. PATENT DOCUMENTS

| | | | |
|---|---|---|---|
| 3,838,208 | 9/1974 | Fujiwara et al. | 358/29 |
| 4,065,790 | 12/1977 | Siegel | 358/172 |
| 4,109,277 | 8/1978 | Schylander | 358/320 |
| 4,386,369 | 5/1983 | Shanley, II et al. | 358/166 |
| 4,459,613 | 7/1984 | Faroudja | 358/37 |
| 4,663,659 | 5/1987 | Blatter | 358/19 |

*Primary Examiner*—Donald McElheny, Jr.
*Attorney, Agent, or Firm*—Robin, Blecker, Daley & Driscoll

[57] ABSTRACT

A video-signal output apparatus according to the present invention is an apparatus for outputting a black-and-white video signal. The video-signal output apparatus is arranged to generate a black-and-white video signal, add a burst signal to the black-and-white video signal, and output the black-and-white video signal with the burst signal added thereto. Accordingly, a black-and-white picture with no cross color can be displayed on a color monitor device.

6 Claims, 1 Drawing Sheet

APPARATUS FOR PROCESSING COLOR OR BLACK AND WHITE VIDEO SIGNALS

This is a continuation of application Ser. No. 390,175, filed Aug. 7, 1989, now abandoned.

BACKGROUND OF THE INVENTION

Field of the Invention

The present invention relates to a video-signal output apparatus for outputting a video signal.

Description of the Related Art

A video tape recorder (hereinafter referred to as a "VTR"), a still video system (hereinafter referred to as an "SV device") and the like have heretofore been known in the field of apparatus for recording a video signal such as a television signal on a recording medium such as a magnetic tape or a magnetic disc and for reproducing a video signal recorded on the recording medium.

In general, the apparatus described above have been arranged to selectively output a color video signal with a burst signal added thereto and a black-and-white video signal with no burst signal added thereto to an external monitor device, etc., for the purpose of reproduction.

In the VTR and the SV device mentioned above, however, since each processing circuit performs signal processing by using a subcarrier signal fsc, it is impossible to perfectly prevent leakage of the subcarrier signal fsc into a black-and-white video signal. Accordingly, when a monitor device receives the black-and-white video signal, an automatic saturation control circuit (ACC circuit) in the monitor device may operate to detect the subcarrier signal fsc which has leaked into the black-and-white video signal, and amplify the detected subcarrier signal fsc to a standard level.

As a result, as the subcarrier signal fsc is amplified, a cross color component in the black-and-white video signal is amplified, thus resulting in the problem that cross color which occurs in the black-and-white video signal is conspicuous compared to the cross color which occurs in the color video signal.

SUMMARY OF THE INVENTION

It is, therefore, one object of the present invention to provide a video-signal output apparatus capable of overcoming the above-described problem.

It is another object of the present invention to provide a video-signal output apparatus capable of outputting a black-and-white video signal which does not cause any cross color in a color monitor device or the like.

To achieve the above objects, in accordance with the present invention, there is provided a video-signal output apparatus for outputting a black-and-white video signal, which comprises, in one preferred form, black-and-white video-signal generating means for generating a black-and-white video signal and burst-signal adding means for adding a burst signal to the black-and-white video signal generated by the black-and-white video-signal generating means and then for outputting the black-and-white video signal with the burst signal added thereto.

It is still another object of the present invention to provide a video-signal output apparatus capable of outputting a black-and-white video signal which can reduce the extent of cross color which occurs while a black-and-white picture is being displayed on a color monitor device.

To achieve the above object, in accordance with the present invention, there is provided a video-signal output apparatus for outputting a color video signal and a black-and-white video signal selectively, which comprises, in one preferred form, video-signal generating means for generating one of a color video signal and a black-and-white video signal; and burst-signal adding means so arranged that, if the video-signal generating means generates a color video signal, it adds a first burst signal having a predetermined amplitude level to the color video signal generated by the video-signal generating means and outputs the color video signal with the first burst signal added thereto and, if the video-signal generating means generates a black-and-white video signal, it adds a second burst signal having an amplitude level larger than the first burst signal to the black-and-white video signal generated by the video-signal generating means and outputs the black-and-white video signal with the second burst signal added thereto.

Further objects, features and advantages of the present invention will become apparent from the following detailed description of embodiments of the present invention with reference to the accompanying drawing.

DETAILED DESCRIPTION OF THE PREFERRED EMBODIMENT

Figure 1:
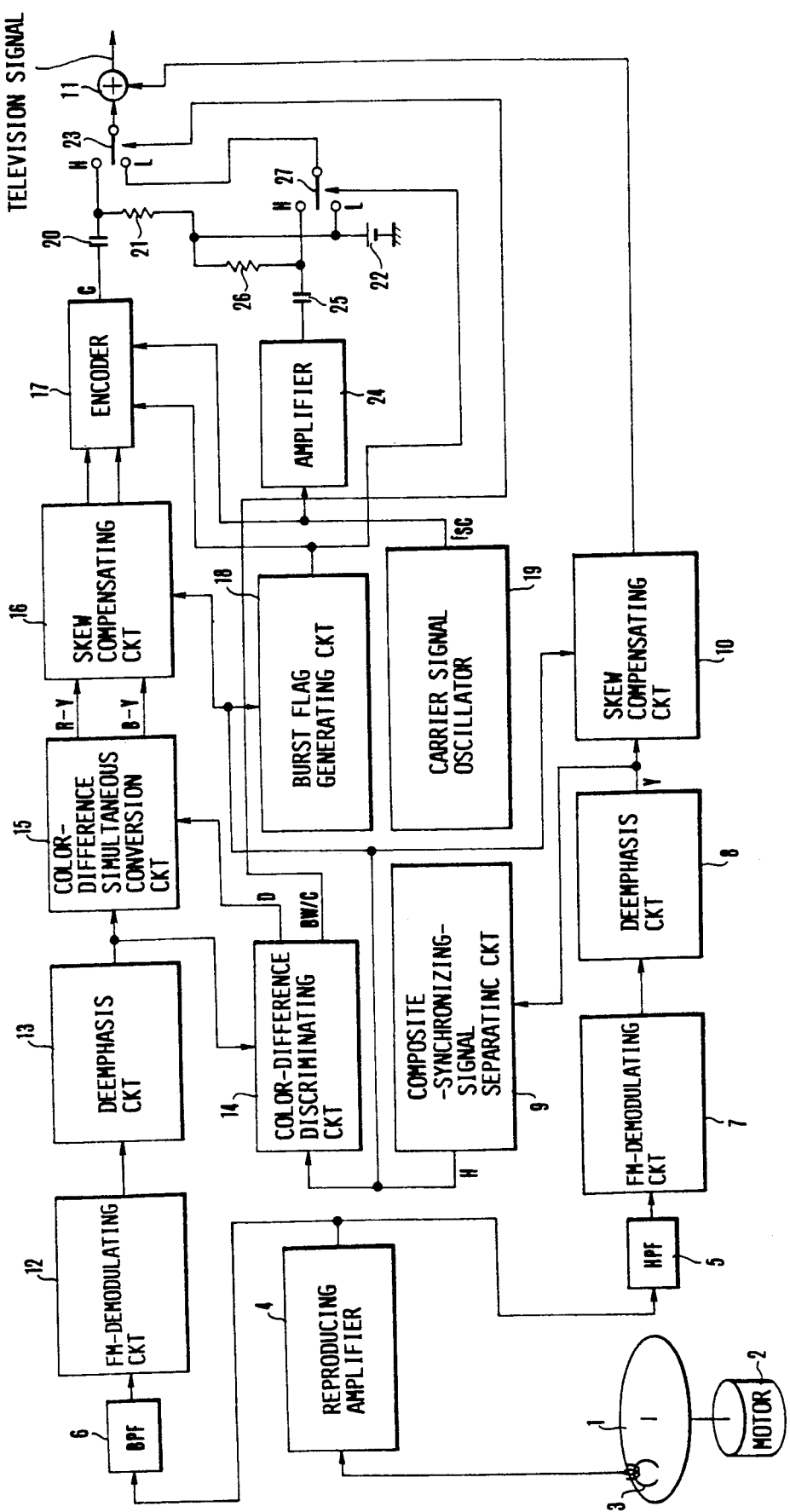
FIG. 1 is a single attached drawing which diagrammatically shows the construction of a still video reproducing apparatus to which one embodiment of the present invention is applied.

The preferred embodiment of the present invention will be described in detail below with reference to the accompanying drawing.

FIG. 1 is a view which diagrammatically shows the construction of a still video reproducing apparatus to which one embodiment of the present invention is applied.

Referring to FIG. 1, a plurality of recording tracks (not shown) are concentrically provided on a magnetic disc 1, and a video signal for one field can be recorded on each recording track.

Referring to the frequency allocation of video signal recorded on the magnetic disc 1, a luminance signal is frequency-modulated into a high-frequency band, and a color signal is converted into a known color-difference line-sequential signal in which two kinds of color-difference signals, i.e., an R-Y signal and B-Y signal, alternately appear every other horizontal scanning period, the DC levels of the R-Y and B-Y signals being offset from each other so that they can be discriminated during reproduction. This known color-difference line-sequential signal is then frequency-modulated into a low-frequency band so that it is frequency-multiplexed with the aforesaid frequency-modulated luminance signal.

The magnetic disc 1 on which video signals are recorded in the above-described manner is caused to rotate by a motor 2 at a predetermined rotational speed. A magnetic head 3 is caused to travel to an arbitrary recording track on the magnetic disc 1 by a head movement mechanism (not shown) so that a particular recorded video signal is reproduced through the magnetic head 3.

The video signal reproduced through the magnetic head 3 is amplified by a reproducing amplifier 4, and supplied to a high-pass filter (HPF) 5 and a band-pass filter (BPF) 6.

The HPF 5 separates the frequency-modulated luminance signal from the reproduced video signal, and the separated luminance signal is frequency-demodulated in a frequency-demodulating circuit 7. After being frequency-demodulated, the luminance signal is subjected to a deemphasis process having characteristics opposite to those of an emphasis process which is effected during recording. The luminance signal thus deemphasized is supplied to a composite-synchronizing-signal separating circuit 9 and a skew compensating circuit 10.

The composite-synchronizing-signal separating circuit 9 separates a composite synchronizing signal from the signal output from the deemphasis circuit 8. The composite synchronizing signal thus separated is supplied to the skew compensating circuit 10. In synchronization with the horizontal synchronizing signal supplied, the skew compensating circuit 10 compensates for the skew of the luminance signal output from the deemphasis circuit 8 and then supplies the resultant signal to an adder 11.

On the other hand, the BPF 6 separates the frequency-modulated color-difference line-sequential signal from the reproduced video signal. The separated color-difference line-sequential signal is frequency-demodulated in a frequency-demodulating circuit 12. Thereafter, in a deemphasis circuit 13, the color-difference line-sequential signal is subjected to a deemphasis process having characteristics opposite to those of an emphasis process which is effected during recording. The signal thus deemphasized is supplied to a color-difference discriminating circuit 14 and a color-difference simultaneous conversion circuit 15.

The color-difference discriminating circuit 14 receives, in addition to the color-difference line-sequential signal supplied in the above-described manner, the composite synchronizing signal obtained by separation in the composite-synchronizing-signal separating circuit 9. In synchronization with the composite synchronizing signal, the color-difference discriminating circuit 14 samples the offset DC level of the supplied color-difference line-sequential signal and compares the sampled DC level with a reference level, thereby determining whether the supplied color-difference line-sequential signal is an R-Y signal or a B-Y signal. The color-difference discriminating circuit 14 then outputs a discrimination signal D indicative of the discrimination result to the color-difference simultaneous conversion circuit 15.

The color-difference discriminating circuit 14 also has the function of determining whether a video signal reproduced through the magnetic head 3 is a color video signal or a black-and-white video signal. More specifically, if the video signal reproduced through the magnetic head 3 is a color video signal, a color-difference line-sequential signal is contained therein, and therefore a discrimination result indicative of an R-Y signal and a discrimination result indicative of a B-Y signal are alternately obtained in synchronization with a horizontal synchronizing period. On the other hand, if the video signal reproduced through the magnetic head 3 is a black-and-white video signal, no color-difference line-sequential signal is contained therein, and therefore a discrimination result indicative of an R-Y signal and a discrimination result indicative of a B-Y signal are not alternately obtained in synchronization with a horizontal synchronizing period. By utilizing such a characteristic, the color-difference discriminating circuit 14 is arranged to output a black-and-white/color discrimination signal BW/C of high level if the video signal reproduced through the magnetic head 3 is a color video signal and to output a black-and-white/color discrimination signal BW/C of low level if the video signal reproduced through the magnetic head 3 is a black-and-white video signal.

Then, the color-difference simultaneous conversion circuit 15 performs simultaneous conversion of the supplied color-difference line-sequential signal in accordance with the discrimination signal D output from the color-difference discriminating circuit 14.

More specifically, the color-difference simultaneous conversion circuit 15 has a delay circuit for delaying the color-difference line-sequential signal output from the deemphasis circuit 13 by an amount equivalent to one horizontal synchronizing period. The color-difference simultaneous conversion circuit 15 selectively outputs the delayed signal and the non-delayed signal of each of the R-Y signal and the B-Y signal while switching them in accordance with the discrimination signal D output from the color-difference discriminating circuit 14. In this manner, the simultaneous conversion of the R-Y signal and the B-Y signal is completed and these R-Y and B-Y signals are supplied to a skew compensating circuit 16.

The skew compensating circuit 16 compensates for the skew of the R-Y signal and the B-Y signal supplied from the color-difference simultaneous conversion circuit 15 in synchronization with the horizontal synchronizing signal separated from the luminance signal in the aforesaid composite-synchronizing-signal separating circuit 9, and then supplies the resultant signal to an encoder 17.

The encoder 17 is further supplied with a burst flag pulse output from a burst flag generating circuit 18 in synchronization with the composite synchronizing signal obtained by separation in the aforesaid composite-synchronizing-signal separating circuit 9 and the carrier signal fsc generated by a carrier-signal oscillator 19. The encoder 17 uses the carrier signal fsc to effect quadrature two-phase modulation of the R-Y signal and the B-Y signal supplied from the skew compensating circuit 16, and adds a burst signal synchronized with the carrier signal fsc to the thus-modulated signal during a period defined by the burst flag pulse. The encoder 17 thereby forms and outputs a chrominance signal C.

Then, a DC component is removed from the chrominance signal, C output from the encoder 17 by a capacitor 20 and the chrominance signal C is supplied to the terminal of a switch 23 which is shown at H in the FIGURE.

The carrier signal fsc is also supplied to an amplifier 24, and the amplifier 24 amplifies the input carrier signal fsc so that the amplitude thereof becomes larger than (e.g., about 1.5 times as large as) the amplitude of the burst signal added to the chrominance signal C output from the encoder 17. The output signal whose amplitude has thus been adjusted by the amplifier 24 is supplied to a capacitor 25, where the DC component is eliminated from the signal. The output of the capacitor 25 is applied to the terminal of a switch 27 which is shown at H in the FIGURE.

In the meantime, a constant voltage is supplied from a constant voltage source 22 to the terminal of the switch 27 which is shown at L in the FIGURE. In addition, the switch 27 is arranged so that the switching operation thereof can be controlled in accordance with a burst flag pulse output from the aforesaid burst flag generating circuit 18.

More specifically, if the burst flag pulse is at a high level, the switch 27 is electrically connected to its terminal shown at H in the FIGURE, a burst signal, whose amplitude has been adjusted by the amplifier 24 so as to become larger than a normal amplitude of the chrominance signal C, is output during a time period corresponding to the portion of the chrominance signal C to which the burst signal is added, the chrominance signal C being output from the encoder 17. If the burst flag pulse is at a low level, the switch 27 is electrically connected to its terminal shown at L in the FIGURE so that a signal of a constant voltage is output from the constant voltage source 22.

The signal which is output from the switch 27 in the above-described manner is supplied to the terminal of the switch 23 which is shown at L in the FIGURE.

The signal output from the constant voltage source 22 is supplied as a bias to each of the capacitors 20 and 25 through respective resistors 21 and 26.

The switch 23 is arranged so that the switching operation thereof can be controlled by the black-and-white/color discrimination signal BW/C output from the color-difference discriminating circuit 14.

More specifically, if the video signal reproduced through the magnetic head 3 is a color video signal, the color-difference discriminating circuit 14 outputs a black-and-white/color discrimination signal BW/C of a high level and, in the case of a black-and-white video signal, a black-and-white/color discrimination signal BW/C of a low level. Accordingly, if the black-and-white/color discrimination signal BW/C is at the high level, the switch 23 which has been supplied with this black-and-white/color discrimination signal BW/C is electrically connected to the terminal shown at H in the FIGURE so that the chrominance signal C output from the encoder 17 is supplied to the adder 11. If the black-and-white/color discrimination signal BW/C is at its low level, the switch 23 is electrically connected to the terminal shown at L in the FIGURE so that the signal output from the switch 27 is supplied to the adder 11.

In the meantime, the adder 11 is, as described above, supplied with the luminance signal from the skew compensating circuit 10. The adder 11 adds this luminance signal to the signal which is supplied form the switch 23 in the aforesaid manner, thereby forming and outputting a color television signal and a black-and-white television signal.

The color or black-and-white television signal output from the adder 11 is supplied to a monitor device (not shown).

In the monitor device, when the color television signal is input thereto, the burst signal is separated from the input color television signal, and an ACC circuit (not shown) then controls the gain of the chrominance signal separated from the input color television signal so that the separated burst signal reaches a predetermined amplitude level. Thereafter, the chrominance signal is decoded into an R-Y signal and a B-Y signal, and the R-Y and B-Y signals are supplied to a matrix circuit (not shown) together with the luminance signal separated from the input color television signal. On the basis of R, G and B signals formed in the matrix circuit, a color picture is reproduced on the Braun tube (not shown) of the monitor device.

If a black-and-white television signal is input, the ACC circuit detects the presence or absence of a burst signal. If no carrier signal component is detected at the burst portion, supply of any color-difference signal to the matrix circuit is inhibited so that a black-and-white picture is displayed on the Braun tube.

If a carrier signal component leaks to the burst portion of a black-and-white television signal and the aforesaid ACC circuit operates to detect the carrier signal component which has leaked, the ACC circuit will increase its gain with respect to the carrier signal component of the black-and-white television signal so that the detected carrier signal component can be set to a predetermined amplitude level and, in addition, a signal corresponding to the color-difference signal component will be supplied to the matrix circuit. As a result, when a black-and-white picture is displayed on the Braun tube, cross color which occurs particularly about the edge portion of an image will emphasized.

In the above-described embodiment, a burst signal, the amplitude level of which is larger than that of a burst signal added to a color television signal, is added to a black-and-white television signal. In consequence, the monitor device regards the black-and-white television signal as a color television signal and reproduces it in a manner similar to that used in reproducing the color television signal. However, since the amplitude level of the burst signal is larger than that of the burst signal added to a normal black-and-white video signal, the ACC circuit controls its gain with respect to a carrier signal component to make the gain smaller than the gain required to amplify a normal carrier signal component. Accordingly, cross color which may occur in a black-and-white picture displayed on the Braun tube is reduced.

As described above, in accordance with the embodiment of the present invention, if a video signal reproduced from a magnetic disc which serves as a recording medium is a black-and-white video signal, then a burst signal, the amplitude level of which is larger than that of a burst signal added to a color video signal, is added to the black-and-white video signal to be output. Accordingly, it is possible to reduce the cross color which may occur in a black-and-white picture displayed on a monitor device.

Although the embodiment has been explained with illustrative reference to the still video reproducing device to which the present invention is applied, the present invention is not limited to the SV device and can of course be applied to other types of device such as VTRs.

What is claimed is:

1. A video signal output apparatus for outputting a color video signal or a black-and-white video signal, comprising:
   A) video-signal generating means for generating a color video signal or a black-and-white video signal;
   B) discriminating means for receiving the video signal generated by said video-signal generating means and determining whether the received signal is a color video signal or a black-and-white signal and providing an output signal indicative of the determination; and
   C) color burst-signal adding means for adding respective first or second color burst signals to the video signal generated by said video-signal generating means responsively to said discriminating means output signal.

2. A video-signal output apparatus according to claim 1, wherein said video-signal generating means includes reproducing means for reproducing the color video signal or the black-and-white video signal from a recording medium on which said color video signal or said black-and-white video signal is recorded.

3. A video signal output apparatus for selectively outputting a color video signal and a black-and-white video signal, comprising:

(A) video-signal generating means for generating one of a color video signal and a black-and-white video signal; and B) burst-signal adding means so arranged that, if said video-signal generating means generates a color video signal, it adds a first burst signal having a predetermined amplitude level to the color video signal generated by said video-signal generating means and outputs said color video signal with said first burst signal added thereto and, if said video-signal generating means generates a black-and-white video signal, it adds a second burst signal having an amplitude level larger than said first burst signal to the black-and-white video signal generated by said video-signal generating means and outputs said black-and-white video signal with said second burst signal added thereto.

4. A video-signal output apparatus according to claim 3, wherein said video-signal generating means includes reproducing means for selectively reproducing a color video signal and a black-and-white video signal from a recording medium on which said color video signal and said black-and-white video signal are recorded.

5. A video-signal output apparatus according to claim 4, wherein said burst-signal adding means comprises:

A) burst-signal generating means for generating said first burst signal and said second burst signal;

B) discriminating means for determining whether a video signal reproduced by said reproducing means is a color video signal or a black-and-white video signal; and C) adder means so arranged that, if said discriminating means determines that the video signal reproduced by said reproducing means is a color video signal, it adds the first burst signal generated by said burst-signal generating means to the color video signal reproduced by said reproducing means and, if said discriminating means determines that the video signal reproduced by said reproducing means is a black-and-white video signal, it adds the second burst signal generated by said burst-signal generating means to the black-and-white video signal reproduced by said reproducing means.

6. A video-signal output apparatus according to claim 3, wherein said second burst signal has an amplitude level which is approximately 1.5 times the amplitude level of said first burst signal.

* * * * *